United States Patent
Mamber et al.

(10) Patent No.: US 8,499,996 B2
(45) Date of Patent: Aug. 6, 2013

(54) METHOD FOR THE QUANTITATIVE DETERMINATION OF SOLDERING AGENT RESIDUES

(75) Inventors: Oliver Mamber, Markgroeningen (DE); Hans Koch, Ditzingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 13/479,729

(22) Filed: May 24, 2012

(65) Prior Publication Data
US 2012/0292376 A1    Nov. 22, 2012

Related U.S. Application Data

(63) Continuation of application No. PCT/EP2010/068096, filed on Nov. 24, 2010.

(30) Foreign Application Priority Data

Nov. 25, 2009  (DE) .................. 10 2009 055 610

(51) Int. Cl.
*B23K 31/02*    (2006.01)

(52) U.S. Cl.
USPC ............ 228/103; 228/201; 228/207; 228/223

(58) Field of Classification Search
None
See application file for complete search history.

(56) References Cited

U.S. PATENT DOCUMENTS

| | | | |
|---|---|---|---|
| 4,530,601 A * | 7/1985 | Tasset | 356/36 |
| 5,005,285 A * | 4/1991 | Ishii | 29/890.043 |
| 5,181,648 A | 1/1993 | Leicht | |
| 5,201,114 A | 4/1993 | Artaki et al. | |
| 5,348,588 A * | 9/1994 | Winston | 134/10 |
| 5,783,938 A * | 7/1998 | Munson et al. | 324/71.2 |
| 5,820,697 A * | 10/1998 | Hamilton et al. | 148/23 |
| 6,050,479 A | 4/2000 | Watanabe et al. | |
| 6,105,850 A | 8/2000 | Lauzon et al. | |
| 6,348,101 B1 * | 2/2002 | Walter | 134/1 |
| 6,367,679 B1 * | 4/2002 | Master et al. | 228/103 |
| 2002/0034825 A1 * | 3/2002 | Schweigart | 436/100 |
| 2003/0121529 A1 * | 7/2003 | Sachdev et al. | 134/2 |
| 2004/0083565 A1 * | 5/2004 | Schildmann et al. | 15/3.5 |
| 2010/0059084 A1 * | 3/2010 | Stach | 134/1 |
| 2010/0163606 A1 * | 7/2010 | Sato et al. | 228/223 |
| 2011/0209730 A1 * | 9/2011 | Varrin et al. | 134/22.19 |

FOREIGN PATENT DOCUMENTS

| | | |
|---|---|---|
| DE | 38 40 098 C1 | 12/1989 |
| DE | 694 08 724 T2 | 6/1998 |
| DE | 197 49 042 C1 | 2/1999 |
| DE | 10 2006 013 428 A1 | 9/2007 |
| JP | 4-172171 | 6/1992 |
| JP | 04-273145 A * | 9/1992 |
| JP | 2008-171668 | 7/2008 |
| JP | 2009-255152 | 11/2009 |

OTHER PUBLICATIONS

Machine translation of JP-2009-255152A (no date).*

* cited by examiner

*Primary Examiner* — Kiley Stoner
(74) *Attorney, Agent, or Firm* — Muncy, Geissler, Olds & Lowe, PLLC

(57) ABSTRACT

A method for quantitatively determining flux material residues remaining on a heat exchanger after a preceding soldering process is provided. To this end, a fluid is applied to the heat exchanger, wherein the remaining quantity of flux material on the heat exchanger after the preceding soldering process is derived from the concentration of soldering agent in the fluid.

18 Claims, 2 Drawing Sheets

Table 1. Rinsing Conditions

| Parameter | Target Value Conditioning | Target Value Rinsing |
|---|---|---|
| Volume flow rate | 300 ± 10 L/h | Table 2 |
| Temperature | Heating to 85 ± 1.5°C | 85 ± 1.5°C |
| Pressure | Increase to 2.3 bar | 2.3 bar |
| Duration | 1 ± 0.1 h | 4 ± 0.1 h |
| Formic acid solution volume | 12 ± 0.1 L | 11.5 ± 0.1 L |

Table 2. Volume Flow Rates

| Aluminum heat exchanger | Volume flow rate |
|---|---|
| Low-temperature coolant cooler | 520 ± 10 L/h |
| High-temperature coolant cooler | 1145 ± 10 L/h |
| Heater | 265 ± 10 L/h |
| Integrated charge air cooler | 530 ± 10 L/h |
| Oil cooler | 580 ± 10 L/h |

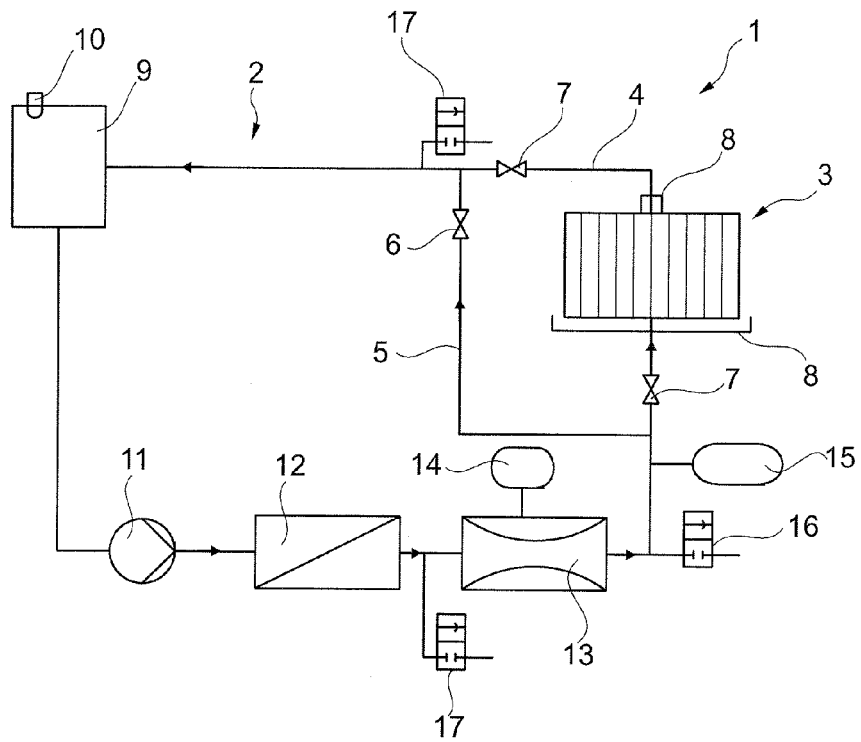

Fig. 1

Table 1. Rinsing Conditions

| Parameter | Target Value Conditioning | Target Value Rinsing |
|---|---|---|
| Volume flow rate | 300 ± 10 L/h | Table 2 |
| Temperature | Heating to 85 ± 1.5°C | 85 ± 1.5°C |
| Pressure | Increase to 2.3 bar | 2.3 bar |
| Duration | 1 ± 0.1 h | 4 ± 0.1 h |
| Formic acid solution volume | 12 ± 0.1 L | 11.5 ± 0.1 L |

Table 2. Volume Flow Rates

| Aluminum heat exchanger | Volume flow rate |
|---|---|
| Low-temperature coolant cooler | 520 ± 10 L/h |
| High-temperature coolant cooler | 1145 ± 10 L/h |
| Heater | 265 ± 10 L/h |
| Integrated charge air cooler | 530 ± 10 L/h |
| Oil cooler | 580 ± 10 L/h |

METHOD FOR THE QUANTITATIVE DETERMINATION OF SOLDERING AGENT RESIDUES

This nonprovisional application is a continuation of International Application No. PCT/EP2010/068096, which was filed on Nov. 24, 2010, and which claims priority to German Patent Application No. DE 10 2009 055 610.9, which was filed in Germany on Nov. 25, 2009, and which are both herein incorporated by reference.

BACKGROUND OF THE INVENTION

1. Field of the Invention

The invention relates to a method for the quantitative determination of soldering aid residues, which remain on a workpiece after a preceding processing step, in which the workpiece is acted upon by a fluid. Further, the invention relates to an apparatus which is suitable to a particular degree for carrying out the method. Moreover, the invention relates to a method for dimensioning a workpiece and/or another part.

2. Description of the Background Art

During the processing of workpieces, it is typical in certain processing steps and often also necessary that they be treated with an auxiliary material supporting the processing step. A typical example of this occurs in soldering processes (soft soldering and/or hard soldering processes) and optionally also in welding processes. In this regard, the materials to be connected together are usually treated beforehand with a so-called flux material, which, for example, is sprinkled in the form of a powder on the parts to be connected together, before the actual soldering process (or welding process) is performed. In this case during heating to carry out the soldering process (or the welding process), the flux material causes a cleaning of the part surfaces, so that the finally formed soldered seam (or weld seam) can be made stronger, more durable, and denser.

The use of flux materials in fact proves advantageous during the processing of the workpiece. Typically, the use of flux materials also entails flux material residues on the workpiece and thereby the associated disadvantages. In particular, after the workpiece is finished, soldering agent residues remaining on it can impair the function and durability of other components, working together with the soldered workpiece, and possibly also the workpiece itself, for example, by corrosion. In fact, it is basically possible to remove soldering agent residues from the workpiece after the soldering process has been completed (for example, by washing), but this can prove to be costly and complicated, particularly when the subsequently necessitated drying processes for the workpiece are considered in addition. An apparatus of this type for removing solder residues on objects is described, for example, in DE 38 40 098 C1, which corresponds to U.S. Pat. No. 5,181,648, or in the Japanese patent abstract JP 04172171 AA. Reduction of the amount of the used flux material is also not easily possible, because such a decrease in the flux material amount can entail a worsening of the soldering result, which is likewise undesirable.

The aforementioned problems arise especially to a particular degree when it concerns the processing of workpieces that have especially fine structures and/or especially many curved surfaces (particularly also with small radii of curvature) and in part closed hollow spaces. For example, heat exchangers, particularly heat exchangers for motor vehicles, can be mentioned as examples for workpieces of this type. Because of the varied hollows spaces in such heat exchangers, washing of the heat exchanger after soldering proves to be tedious and problematic. A reduction in the amount of employed flux material is also out of the question, because due to the large proportion of parts to be soldered together the risk of leaking would rise very rapidly to no longer acceptable values.

Another problem occurring in practice is that with the use of soldering aids, particularly of flux materials, empirical values are often drawn upon, when it is a matter of determining the amount of soldering aids to be used during the processing of the workpiece. As a rule, these empirical values are based on the finished soldering result (therefore particularly as to whether or not leaks occur during the soldering process). Because resoldering of workpieces is relatively complicated and expensive, the tendency therefore is to select the amount of the employed soldering aid as higher than the actually necessary amount (this also applies to scrap workpieces). This leads not only to an unnecessarily high consumption of soldering aids (which entails corresponding production costs and environmental pollution unnecessary per se), but also to the situation that the workpiece and other parts, operated together with the workpiece, in a machine are exposed to correspondingly higher wear by the (unnecessarily) high soldering aid residues, and accordingly must be constructed as more durable. This also leads to disadvantages such as particularly cost and weight disadvantages.

SUMMARY OF THE INVENTION

It is therefore an object of the invention to improve heat exchangers, in particular, with specially defined properties.

This object is attained by the proposed method for the quantitative determination of soldering aid residues, such as especially flux material residues, which remain on a workpiece after a preceding processing step, by the proposed apparatus for advantageously carrying out the method, and by the proposed method for dimensioning a workpiece.

It is proposed to carry out a method for the quantitative determination of soldering aid residues, particularly of flux material residues, which remain on a workpiece after a preceding processing step, in which the workpiece is acted upon by a fluid, in such a way that the soldering aid amount remaining on the workpiece after the preceding processing step is derived from the soldering aid concentration in the fluid. It is therefore possible to wash the workpiece to a certain extent with the employed fluid after one, several, or all processing steps necessary for finishing the workpiece. Instead of reusing, disposing of, or recycling the fluid after the washing process, the concentration of soldering aid (particularly flux material) contained in the fluid used for washing is measured according to the proposed method. It is possible to derive the soldering aid amount, present before the fluid treatment, on and/or in the (finished) processed workpiece with the help of the measured concentration (or the measured change in concentration). To this end, it is generally practical to determine the soldering aid concentration in the fluid after each individual "washed" workpiece (optionally a concentration measurement before the "washing process" is also sensible and/or necessary). Of course, a type of statistical averaging can also be used by "washing" a certain number (for example, three) heat exchangers immediately one after the other, and measuring the concentration or the change in concentration only after this plurality of heat exchangers (whereby during the subsequent calculation the number of heat exchangers is naturally taken into account). The proposed concentration measurement "per workpiece" differs from prior cleaning processes, in which the soldering aid concentration in a washing liquid is measured. In prior-art methods (see, for example, JP 04172171 AA or DE 38 40 098 C1), each measured soldering aid concentration is used only to determine whether the washing liquid must be renewed or can still continue to be used. It is possible to carry out the method especially at the very end of the production chain for the workpiece. But it may also prove advantageous, however, to carry out the method before, therefore after an intermediate step in the production chain for the workpiece. The treatment of the workpiece with the fluid can be carried out in such a way that the amount of soldering aid remaining on and/or in the workpiece is substantially completely removed. It is also possible, however, to carry out the method in such a way that a portion, defined as precisely as possible, of the soldering aid remaining on and/or in the workpiece is taken up by the fluid. In such a case as well, it is possible to derive the soldering aid amount remaining on the workpiece after the preceding processing step from the soldering aid concentration in the fluid. The fluid naturally can also be any mixture of different fluids. In particular, it can be a liquid, a liquid-gas mixture, and/or a supercritical fluid. The fluid in this case may also have a certain amount of solid particles and/or gases. A gas-solid mixture is also conceivable if necessary. Of course, the soldering aids can also be a mixture of different soldering aids. The proposed method is particularly suitable for being carried out on a random basis particularly in series production and/or being used in the run-up to planning a series production within the scope of preproduction or pilot plant series. Based on the measured values determined with the aid of the proposed method, it is especially possible to select an especially suitable amount (particularly a just sufficient amount) of soldering aids necessary for processing the workpiece. It is particularly possible as a result during later use of the workpiece to reduce the stress on the workpiece and other parts, interacting with the workpiece in the installed state, and/or to take into account the resulting stress at the outset in the design of the workpiece or the other parts. As a result, the durability of the resulting structure can be increased or better adapted to the lifetime of the entire installation. Further, with consideration of the values determined with the proposed method, it is also possible in particular to reduce the amount of utilized soldering aids in order to lower costs in this way and to reduce unnecessary environmental pollution.

It is especially advantageous when the proposed method is carried out in such a way that a defined volume of fluid is used. As a result, it is possible especially simply, for example, to derive the soldering aid amount remaining on and/or in the workpiece from the soldering aid concentration in the fluid. It is possible as a result, moreover, to adapt the "testing environment" especially well to the later actual installation situation. When the workpiece, for example, is a coolant cooler for a motor vehicle, thus the measuring method can be carried out particularly with a fluid volume that corresponds to the coolant volume in the vehicle coolant circuit. Naturally, it is likewise possible to carry out the method also with varying fluid volumes, to determine the fluid volume, and to convert the obtained values appropriately.

The method is especially advantageous, moreover, when the preceding processing step is a soldering process. In such a case, the measured values obtained with the method can prove to be especially meaningful in regard to optimizing the soldering process (particularly with respect to the employed soldering aid amount). It is also possible, however, to carry out the method at another time, such as particularly at the very end of the workpiece production process.

The method proves especially suitable, when the workpiece concerns at least in part a heat exchanger device. Especially heat exchangers in current versions (tube box-flat tube heat exchangers with corrugated fins) have an especially high number of soldering sites, whereby with a large number of these soldering sites it is important in addition that these are made fluid-tight. Also, these have a relatively large number of internal hollow spaces. Accordingly in the case of such heat exchangers there is an especially great potential of optimizing options with respect to the soldering process and the durability of the workpiece and also components interacting with the workpiece in an operating state.

It is especially advantageous, further, when the workpiece is made at least in sections of aluminum, of an aluminum alloy, of nonferrous metal, and/or of a nonferrous metal alloy. Such materials in particular often require soldering aids for their processing, especially for their soldering and/or welding, so that they can be processed reasonably or at all.

It is proposed, further, that when the method is carried out, an aqueous solution, water, and/or a vehicle coolant are used as the fluid. This can be particularly water (specially deionized water), which is provided with additives such as, for example, with an acid and/or an alkaline solution. In initial tests such fluids have proven especially advantageous for carrying out the method or for obtaining especially meaningful values. Especially advantageous results were achieved with a mixture of water (specially deionized water) and formic acid, whereby the formic acid concentration is taken preferably from an interval whose top or bottom limit is 0%, 5%, 10%, 15%, 20%, 25%, and/or 30%.

It can prove particularly advantageous in carrying out the method when the fluid is neutral, alkaline, and/or acidic. The pH value can be selected particularly in regard to the later use of the workpiece and/or in regard to later specifications required by a customer or test procedures.

It is especially advantageous, when the method is carried out in such a way that the workpiece is acted upon by the fluid only in an operation-related contact area, where the workpiece in a normal operating state comes into contact with a fluid, particularly with a liquid, especially with an aqueous liquid. To stay with the application example particularly of a coolant cooler, the measuring method is carried out in such a way that the measuring fluid is passed only through the areas of the heat exchanger that are provided for the flow of coolant. The outer areas of the heat exchanger, which are supplied with outside air, in contrast, are not supplied with the fluid. In such a case, the significance of the values obtained by using the proposed method can be increased further. It should be mentioned only for the sake of completeness that usable measurement results can also be obtained, of course, in other ways, such as, for example, by measuring two similar heat exchangers, one of which is completely washed ("inside" and "outside"), and the other is washed only "outside" and the two measured values are subtracted from one another to determine the final result.

It is proposed, further, to carry out the method in such a way that at least at times, preferably at least initially, it is carried out under defined conditions, particularly with respect to the workpiece temperature, the fluid temperature, the duration of the measuring process, the fluid throughput through the workpiece, the composition of the fluid, the pressure, and/or the duration of the measurement. When using conditions defined in such a way, it is especially possible to be able to obtain especially meaningful and reproducible measurement results. In initial tests, it became apparent, moreover, that particularly the mentioned parameters have an especially great effect on the significance of the obtained measured values.

It is proposed, further, to carry out the method in such a way that at least at times and/or at least partially it is carried out as a circulation process. In particular, this can be a closed circulation process. It is possible in this way to determine the remaining soldering aid amount especially well, particularly largely completely, without an excessive amount of fluid being necessary. Moreover, the measuring accuracy of the method can improve, because a relatively high concentration value in the fluid is ultimately measured, which typically results in lower measuring accuracies. Moreover, the consumption of fluid can be reduced and, for example, the energy necessary for carrying out the method (particularly heat energy for the fluid) can be reduced, which is also an advantage.

It is proposed further that in the method measurement sensors are used and/or samples are taken to determine the measured values. Measurement sensors are usually especially suitable to be able to obtain measured values especially rapidly, which are generally also sufficiently accurate. Taking of samples can be used in particular to obtain especially accurate measured values or to verify questionable measured values. Moreover, taken samples can be stored in order to be used at a later time (for example, in the case of a liability problem).

It has also proven advantageous, when at least one cleaning process is carried out in the method before and/or after a measurement. In this way, the system can be cleaned, so that, for example, soldering aid residues from prior measurements can be removed reliably, and thus have no effect or only a marginal effect on subsequent measurements. This also can prove to be essential for the reliability of the determined measured values.

An apparatus for carrying out the above-described methods is furthermore proposed, which has at least one test connection, at least one pump device, and at least one closed circulation device. In particular, the apparatus can be designed and set up in such a way that it carries out the above-described method. The test connection in this case represents the simplest possible and quickly reversible arrangement of the workpiece to be tested, such as particularly a heat exchanger to be tested in the apparatus. In this case, connecting elements can preferably be used which correspond to the connector possibly present in any case (for example, a fluid flange) for the workpiece. An apparatus designed in this way has the properties and advantages already described above.

It is proposed to design the apparatus preferably in such a way that it has at least one equalizing tank, at least one electronic control device, at least one temperature control device, at least one sensor device, at least one preferably controllable fluid supply option, at least one preferably controllable fluid removal option, and/or at least one bypass device. With the use of the electronic control device it is especially possible to achieve automated, reproducible, and/or especially meaningful measured values which are especially simple to determine. Using a temperature control device (heating and/or cooling) it is especially possible to adjust the fluid to a suitable temperature. Different values can be determined by using at least one sensor device, especially the actual measured values, but optionally also "auxiliary values" such as the fluid temperature or the like. With the use of the fluid supply option or the fluid removal option, it is possible to take samples, to add additives, to replace or replenish the fluid, and/or the like. Preferably, in this case, the fluid supply option and/or the fluid removal option can be controlled externally, such as particularly with the use of the electronic control device. With the use of the equalizing tank, it is possible in particular to leave, for example, a closed circuit sufficiently filled, also when samples are taken or liquid and/or additives are added (repeatedly if necessary). A bypass device is advantageous particularly because the fluid can be conditioned beforehand (for example by heating or cooling, whereby the fluid can be conditioned especially homogeneously), without the fluid first flowing through the workpiece to be tested (test piece). It is particularly possible in this way to begin the actual measurement under especially well reproducible starting conditions (closing of the bypass and opening of the actual circuit), as a result of which especially informative measured values can be obtained.

Further, a method for dimensioning a workpiece and/or another part is proposed, in which the design of the workpiece and/or the other component and the stress on the workpiece and/or the other component by the soldering aid residues originating from the workpiece, especially the flux material residues, are taken into account, whereby preferably the above-described method for the quantitative determination of soldering aid residues and/or an apparatus with the above-described structure are used. With the use of the proposed method the already above-described advantages and properties can be realized in a similar way.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows the schematic circuit diagram of an exemplary embodiment of a test system.

DETAILED DESCRIPTION

Figure 2:
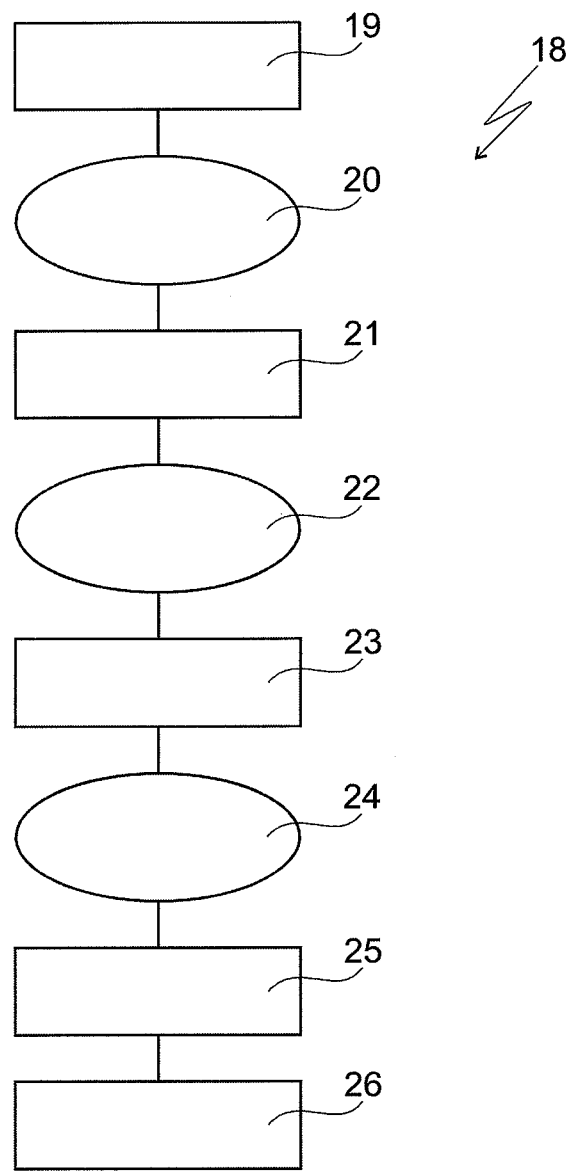
FIG. 2 shows a first exemplary embodiment for the course of a measuring process.

Shown in FIG. 1 in a schematic illustration is the circuit diagram of a first conceivable exemplary embodiment for a test system 1, with which the amount of the flux material remaining in a completed heat exchanger 3 to be tested (test piece) can be measured. Heat exchanger 3 was manufactured as a flat tube heat exchanger 3 known per se with lateral tube boxes, in which the flat tubes are inserted and then soldered to these. The actual soldering process in this case occurs, in a likewise known manner, by coating the flat tubes with solder and heating the fully assembled and prefixed heat exchanger 3 in a continuous heating furnace. To achieve an acceptable soldering result, the fully assembled heat exchanger 3 is dusted with flux material before heating, especially with a fluoroaluminate-containing flux material. After heat exchanger 3 cools, an (initially unknown) amount of excess flux material remains in the interior of heat exchanger 3. This residual amount of flux material remaining in heat exchanger 3 is to be determined with the use of test system 1.

As can be gathered from FIG. 1, rinsing circuit 2 of test unit 1 comprises a main circuit 4, and as a secondary circuit, a so-called bypass 5. Both main circuit 4 and bypass 5 can be released or blocked via an electrically controllable valve 6, 7. As is also evident from FIG. 1, heat exchanger 3 to be tested is looped into main circuit 4 of rinsing circuit 2. The connection of heat exchanger 3 to rinsing cycle 2 occurs via standard connecting elements 8 known per se, which are drawn only schematically in the present case. Main circuit 4, moreover, both before and after heat exchanger 3 to be tested, has in each case an electric control valve 7, so that heat exchanger 3 can be removed without rinsing cycle 2 having to be necessarily emptied. Solely for the sake of completeness, it is pointed out that heat exchanger 3 is not part of test system 1, but is installed only to make a measurement in test system 1.

Further, an equalizing tank 9, an electric pump 11, a heater 12 (for example, an electric heater or a heat exchanger), and a flow meter 13 with an associated flow meter sensor 14 are looped in rinsing cycle 2 of test system 1. Rinsing cycle 2 is also provided with a temperature measurement sensor 15, a sampling valve 16, and two drain valves 17. Sampling valve 16 and both drain valves 17, like control valves 6, 7, are made as electrically controllable valves and can be controlled, for example, via an electronic control circuit (not shown here). The measured values of flow meter sensor 14 and temperature measurement sensor 15 in the exemplary embodiment shown here in FIG. 1 can also be output in electronic form, and can be processed, for example, by the electronic control circuit. Moreover, equalizing tank 9 is provided with a ventilation valve 10, which can also be controlled electrically (as, for example, by the electronic control circuit). The pump output of electric pump 11 and the heat output of heater 12 can also be regulated by the electronic control circuit.

An exemplary embodiment for a measuring process is evident from the flowchart 18 shown in FIG. 2. First of all, test system 1 is initialized 19 (provided this has not already taken place). To this end, rinsing cycle 2 of test system 1 (more precisely: rinsing cycle 2 with bypass 5 with bypassing of main circuit 4 or heat exchanger 3 to be tested) is filled with the test fluid. In the present case, the test fluid is a 10% aqueous formic acid solution here with a volume of 12 L. To prepare the 10% formic acid solution, 10.8 L of deionized water is combined with 1.2 L of formic acid (98 to 100%, high grade). After the initialization of rinsing cycle 2, heat exchanger 3 to be tested is installed 20 in the main circuit of test system 1, in that connecting elements 8 are connected to heat exchanger 3 (process step 20).

After the installation 20 of heat exchanger 3, the conditioning 21 of rinsing cycle 2 begins. To this end, the aqueous formic acid solution is circulated in the closed circulation comprising rinsing circuit 2 and bypass 5 (main circuit 4 is bypassed) by a suitably controlled electric pump 11. The volume flow rate selected in the present exemplary embodiment is about 300 L per hour (compare Table 1). At the same time, the test fluid is heated by heater 12 to a temperature of 85° C. The conditioning phase 21 in the present exemplary embodiment lasts ca. 1 hour.

It is pointed out that initialization 19, installation 20 of heat exchanger 3, and conditioning 21 can also occur in a different sequence. It is possible in particular to start the conditioning 21 even before the installation 20 of heat exchanger 3 or to carry out the initialization 19 of test system 1 only after the installation 20 of heat exchanger 3.

After completion of the conditioning phase 21, first a blank sample is taken 22, in order to be able to analyze it subsequently. In the present case, 0.5 L of the formic acid solution is removed, so that for the rest of the process 11.5 L of the formic acid solution remains in rinsing circuit 2. The taking 22 of the blank sample has no influence on test system 1 due to equalizing tank 9. To make taking 22 of the blank sample via sampling valve 16 easier, ventilation valve 10 is opened concurrently.

Now the actual rinsing process 23 begins in which the rinsing fluid is conveyed through heat exchanger 3 to be tested. To this end, bypass 5 is closed by closing control valve 6, whereas main channel 4 is opened by opening the two control valves 7. Because heat exchanger 3 to be tested is at first not filled with rinsing fluid, air is initially present in the system. In order to remove this air as rapidly as possible from rinsing circuit 2 (equalizing tank 9 is also used for this purpose), the electrical voltage applied to electric pump 11 is increased for a short time and the volume flow rate through heat exchanger 3 is increased, for example, to 1400 L per hour. After this startup phase, electric pump 11 is controlled with a suitable low voltage, so that the volume flow rate from Table 2 results for heat exchanger 3 to be tested. Ventilation valve 10 of equalizing tank 9 is closed parallel thereto.

The rinsing process 23 of heat exchanger 3 in the exemplary embodiment shown here occurs over 4 hours (compare Table 1). After the 4 hours of rinsing time 23 have been completed, rinsing circuit 2 is turned off by switching off electric pump 11. Ventilation valve 10 of equalizing tank 9 is then opened and the actual analysis sample is taken 24 via sampling valve 16. Because there is liquid in sampling valve 16, as a precaution at first ca. 2 L of the rinsing fluid is drained before the analysis sample is taken (similar to the blank sample of ca. 0.5 L). Thereafter the rinsing circuit 2 of test system 1 is completely emptied 25 via drain valve 17.

After the emptying 25 of rinsing circuit 2, rinsing circuit 2 is cleaned 26. To do this, for example, after the draining 25 of the rinsing fluid, rinsing circuit 2 is filled and rinsed twice for about 5 minutes with tap water. Next, the rinsing circuit 2 is again cleaned twice with a hydrochloric acid solution, which is prepared from ca. 11.5 L of tap water and ca. 0.6 L of 32% hydrochloric acid. The hydrochloric acid solution is used for rinsing until a temperature of ca. 50° C. is reached with heater 12 turned on. After these two cleaning steps, the rinsing circuit 2 is again rinsed with tap water until the measured pH of the liquid present in the rinsing circuit 2 substantially corresponds to the tap water quality. This measurement can occur, for example, with a pH meter, which is installed in rinsing circuit 2. Generally, the last cleaning step must be performed about 3 to 4 times for about 5 minutes in each case.

After each cleaning step, all valves 10, 16, 17 must be opened, because the entire solution can only be drained in this way.

The actual analysis result is obtained by the analysis of the blank sample (taken in step 22), analysis of the analysis sample (taken in step 24), and their subsequent comparison. In particular, the two samples can be analyzed for their potassium content according to DIN ISO 9964-3.

The dissolved flux material residual amount can be calculated with the following formula:

$$FRW = (([K^+]_{AP} \cdot 11.5\ L - [K^+]_{BP} \cdot 12.0\ L) \cdot 100\%/K^+_{FR}\%) \cdot C$$

where FRW stands for the content of flux material residues in heat exchanger 3 to be tested in mg, $[K^+]_{AP}$ for the potassium content in the analysis sample in mg/L, $[K^+]_{BP}$ for the potassium content in the blank sample in mg/L, $K^+_{FR}\%$ for the percentage of potassium in the employed flux material, and C for a correction factor specific for each flux material.

TABLE 1

Rinsing Conditions

| Parameter | Target Value Conditioning | Target Value Rinsing |
|---|---|---|
| Volume flow rate | 300 ± 10 L/h | Table 2 |
| Temperature | Heating to 85 ± 1.5° C. | 85 ± 1.5° C. |

TABLE 1-continued

Rinsing Conditions

| Parameter | Target Value Conditioning | Target Value Rinsing |
|---|---|---|
| Pressure | Increase to 2.3 bar | 2.3 bar |
| Duration | 1 ± 0.1 h | 4 ± 0.1 h |
| Formic acid solution volume | 12 ± 0.1 L | 11.5 ± 0.1 L |

TABLE 2

Volume Flow Rates

| Aluminum heat exchanger | Volume flow rate |
|---|---|
| Low-temperature coolant cooler | 520 ± 10 L/h |
| High-temperature coolant cooler | 1145 ± 10 L/h |
| Heater | 265 ± 10 L/h |
| Integrated charge air cooler | 530 ± 10 L/h |
| Oil cooler | 580 ± 10 L/h |

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for quantitative determination of soldering aid residues which remain on a workpiece after a preceding processing step, the method comprising:
    acting upon the workpiece by a fluid circulation system; and
    deriving a soldering aid amount remaining on the workpiece after the preceding process step from a soldering aid concentration in the fluid,
    wherein the fluid circulation system includes a main circuit in which the workpiece is connectable, a rinsing circuit connected to the main circuit and a bypass device,
    wherein at least one cleaning process of the rinsing circuit is carried out before and/or after a measurement, and
    wherein the main circuit is excluded from the at least one cleaning process via the bypass device.

2. The method according to claim 1, wherein a defined volume of fluid is used to carry out the method.

3. The method according to claim 1, wherein the preceding processing step is a soldering process.

4. The method according to claim 1, wherein the workpiece is a part of a heat exchanger device.

5. The method according to claim 1, wherein the workpiece is made at least in sections of aluminum, of an aluminum alloy, of nonferrous metal, and/or of a nonferrous metal alloy.

6. The method according to claim 1, wherein an aqueous solution, water, and/or a vehicle coolant are used as the fluid.

7. The method according to claim 1, wherein the fluid is neutral, alkaline, and/or acidic.

8. The method according to claim 1, wherein the workpiece is acted upon by the fluid only in an operation-related contact area, and wherein the workpiece in a normal operating state comes into contact with a fluid.

9. The method according to claim 1, wherein the method is carried out at least at times, under defined conditions, the defined conditions including a workpiece temperature, a fluid temperature, a duration of a measuring process, a fluid throughput through the workpiece, a composition of the fluid, a pressure, and/or a duration of the measurement.

10. The method according to claim 1, wherein the acting upon the workpiece by the fluid circulation system is carried out at least at times and/or at least partially as a closed circulation process.

11. The method according to claim 1, wherein measurement sensors are used and/or samples are taken to determine the measured values.

12. An apparatus for carrying out the method according to claim 1, wherein the apparatus comprises at least one test connection, at least one pump device, and at least one closed circulation device.

13. The apparatus according to claim 12, further comprising: at least one equalizing tank, at least one electronic control device, at least one temperature control device, at least one sensor device, at least one controllable fluid supply option, and at least one controllable fluid removal option.

14. A method for dimensioning a workpiece and/or another component, wherein during a design of the workpiece and/or another component a stress on the workpiece and/or the other component and the soldering aid residues originating from the workpiece after a preceding processing step are determined,
    wherein the determination of soldering aid residues includes acting upon the workpiece by a fluid circulation system, and deriving a soldering aid amount remaining on the workpiece after the preceding process step from a soldering aid concentration in the fluid,
    wherein the fluid circulation system includes a main circuit in which the workpiece is connectable, a rinsing circuit connected to the main circuit and a bypass device,
    wherein at least one cleaning process of the rinsing circuit is carried out before and/or after the determination, and
    wherein the main circuit is excluded from the at least one cleaning process via the bypass device.

15. The method according to claim 1, wherein the soldering aid residues is flux material residues.

16. The method according to claim 8, wherein the fluid is an aqueous liquid.

17. The method according to claim 1, wherein during the at least one cleaning process carried out before the measurement, a volume flow rate of the fluid is 300 L per hour and a temperature of the fluid is 85° C.

18. The method according to claim 17, wherein the at least one cleaning process carried out before the measurement lasts for one hour.

* * * * *